(12) United States Patent
Horton et al.

(10) Patent No.: US 7,650,593 B2
(45) Date of Patent: Jan. 19, 2010

(54) PROXY OBJECTS FOR DISPLAY

(75) Inventors: Anson Horton, Sammamish, WA (US); Michael Montwill, Seattle, WA (US); Daigo Hamura, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 836 days.

(21) Appl. No.: 10/809,147

(22) Filed: Mar. 25, 2004

(65) Prior Publication Data

US 2005/0216893 A1    Sep. 29, 2005

(51) Int. Cl.
*G06F 9/44* (2006.01)
*G06F 3/00* (2006.01)
*G06F 3/048* (2006.01)

(52) U.S. Cl. .............. 717/125; 717/113; 717/116; 715/747; 715/763

(58) Field of Classification Search ............ 717/124
See application file for complete search history.

(56) References Cited

U.S. PATENT DOCUMENTS

| | | | | |
|---|---|---|---|---|
| 5,410,703 A * | 4/1995 | Nilsson et al. | ............ | 717/168 |
| 5,642,511 A * | 6/1997 | Chow et al. | ............ | 717/105 |
| 5,740,440 A * | 4/1998 | West | ............ | 717/125 |
| 5,815,653 A * | 9/1998 | You et al. | ............ | 714/38 |
| 5,892,949 A * | 4/1999 | Noble | ............ | 717/125 |
| 6,006,224 A * | 12/1999 | McComb et al. | ............ | 707/5 |
| 6,038,395 A * | 3/2000 | Chow et al. | ............ | 717/105 |
| 6,040,830 A * | 3/2000 | Sahoo | ............ | 715/747 |
| 6,240,549 B1 * | 5/2001 | Hamada et al. | ............ | 717/130 |
| 6,275,979 B1 * | 8/2001 | Graser et al. | ............ | 717/100 |
| 6,336,118 B1 * | 1/2002 | Hammond | ............ | 707/103 Y |
| 6,345,382 B1 * | 2/2002 | Hughes | ............ | 717/100 |
| 6,633,888 B1 * | 10/2003 | Kobayashi | ............ | 707/103 R |
| 6,637,020 B1 * | 10/2003 | Hammond | ............ | 717/107 |
| 6,879,998 B1 * | 4/2005 | Raciborski et al. | ............ | 709/219 |
| 6,892,326 B2 * | 5/2005 | Ma et al. | ............ | 714/38 |
| 6,915,520 B2 * | 7/2005 | Sanchez, II | ............ | 719/315 |
| 6,928,453 B2 * | 8/2005 | Roddy | ............ | 707/103 R |
| 6,948,002 B2 * | 9/2005 | Chan et al. | ............ | 709/246 |
| 6,961,924 B2 * | 11/2005 | Bates et al. | ............ | 717/125 |
| 7,191,172 B2 * | 3/2007 | McGrath et al. | ............ | 707/2 |
| 7,251,808 B2 * | 7/2007 | Bates et al. | ............ | 717/125 |
| 7,284,240 B1 * | 10/2007 | Fleegal | ............ | 717/137 |
| 7,392,506 B2 * | 6/2008 | Garcowski et al. | ............ | 717/107 |
| 7,428,559 B2 * | 9/2008 | Hill et al. | ............ | 707/203 |
| 7,516,447 B2 * | 4/2009 | Marvin et al. | ............ | 717/140 |

(Continued)

OTHER PUBLICATIONS

Hayne et al., "Microsoft Computer Dictionary Fifth Edition", 2002, Microsoft Press, Fifth Edition, p. 2.*

(Continued)

*Primary Examiner*—Tuan Q Dam
*Assistant Examiner*—Marina Lee
(74) *Attorney, Agent, or Firm*—Workman Nydegger (57) ABSTRACT

A system and method facilitating attributed debugging is provided that facilitates a developer of an object to determine what information a debugger displays. An expression evaluator is provided. A debuggee (e.g., process to be debugged) can include a display proxy attribute that identifies a display proxy type associated with an object. When a request to examine the object is received by the expression evaluator, the expression can create the display proxy associated with the object, examine the display proxy, and provide information associated with the display proxy in response to the request to examine the object.

24 Claims, 6 Drawing Sheets

U.S. PATENT DOCUMENTS

| | | | | |
|---|---|---|---|---|
| 2002/0199035 | A1* | 12/2002 | Christensen et al. | 709/330 |
| 2003/0188042 | A1 | 10/2003 | Anaya et al. | |
| 2003/0204838 | A1* | 10/2003 | Caspole et al. | 717/130 |
| 2003/0221185 | A1 | 11/2003 | Bates et al. | |
| 2003/0233636 | A1 | 12/2003 | Crawford | |
| 2004/0001092 | A1* | 1/2004 | Rothwein et al. | 345/763 |
| 2004/0172623 | A1* | 9/2004 | Eckels et al. | 717/125 |
| 2004/0230954 | A1* | 11/2004 | Dandoy | 717/124 |
| 2005/0060689 | A1* | 3/2005 | Bates et al. | 717/125 |

OTHER PUBLICATIONS

Shaykat Chaudhuri, "Debugging in Visual Studio .NET", Jan. 2002, retrieved from <http://msdn.microsoft.com/enus/library/aa290350(VS.71).aspx#vstchdebugginginvisualstudionetanchor2> pp. 1-6.*

Glenn Ammons, et al., Debugging Temporal Specifications with Concept Analysis, PLDI'03, Jun. 9-11, 2003, pp. 182-195, San Diego, California, USA.

Timothy Jacobs, et al., Interactive Visual Debugging with UML, ACM Symposium on Software Visualization, 2003, pp. 115-122, San Diego, California, USA.

Chanika Hobatr, et al., Using OCL-Queries for Debugging C++, 2001 IEEE, 2001, pp. 839-840.

Raimondas Lencevicius, et al., Query-Based Debugging of Object-Oriented Programs, OOPSLA '97, Oct. 1997, pp. 304-317, Georgia, USA.

Lisa Burnell, et al., Structure and Chance: Melding Logic and Probability for Software Debugging, Communications of the ACM, 1995, 28 pp., vol. 38-Issue 3.

Office Action dated Apr. 19, 2007 cited in U.S. Appl. No. 10/808,905.
Office Action dated Oct. 4, 2007 cited in U.S. Appl. No. 10/808,905.
Office Action dated Jan. 11, 2008 cited in U.S. Appl. No. 10/808,905.
Office Action dated Aug. 5, 2008 cited in U.S. Appl. No. 10/808,905.

* cited by examiner

| Watch 1 | | |
|---|---|---|
| Name | Value | Type |
| ⊟ ht | Count = 2 | System.Collections.Hashtable |
| ⊞ "Two" | 2 | object {int} |
| ⊟ "Three" | 3 | object {int} |
| Key | "Three" | object {string} |
| Value | 3 | object {int} |

Autos | Locals | Watch 1

PROXY OBJECTS FOR DISPLAY

CROSS-REFERENCE TO RELATED APPLICATIONS

This application is related to co-pending U.S. utility application Ser. No. 10/808,905 filed on Mar. 25, 2004, entitled ATTRIBUTED DEBUGGING, the entirety of which is incorporated herein by reference.

TECHNICAL FIELD

The present invention relates generally to computer system(s), and, more particularly to debugging of computer process(es).

BACKGROUND OF THE INVENTION

The development of computer software can involve the identification and correction of software anomalies (e.g., "bugs"). These bugs can effect the operation and/or intended function(s) the computer software. Identification and/or correction of bugs can require the expenditure of resources, for example, time and/or labor.

The practice of finding bugs is known as software "debugging". Conventional debugging has taken on many forms, from the simple, for example, manually reviewing software code in an effort to find errant code, to the complex and automated. For example, another computer application known as a "debugger" can operate on and execute software code in a "step-by-step" manner to assist a developer in identifying bug(s).

Conventional debugger(s) include graphical user interface (GUI) debugger(s) that can include an ability to display runtime object data to a developer. However, conventional debugger(s) have been limited in their ability to identify and/or present meaningful information to the developer.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating attributed debugging. "Attributes" refers to keyword-like tags in which additional information about entities can be specified. Attributes, which are saved with an assembly's metadata, annotate programming elements such as types, fields, methods, and properties. Other applications, such as compiler(s) and/or debugger(s) can refer to the information in attributes to determine how objects should be used.

Perhaps the single most important feature of conventional GUI debugger(s) is their ability to display runtime object data to the developer in a very simple and meaningful way. Prominently displaying values that the developer is most interested has proven extremely difficult for conventional GUI debugger(s) to do. For example, examination of large complicated object(s) with conventional GUI debugger(s) has been a frustrating and daunting task for developer(s). This is due, at least in part, to the inability of the debugger to analyze arbitrary objects and determine what the developer is really interested in viewing.

The system and method of the present invention facilitate a developer of an object to determine what the debugger displays. In accordance with an aspect of the present invention, an attributed debugging system having a debugger with an expression evaluator is provided. The system can further include, optionally, a debuggee (e.g., process to be debugged). The debuggee includes display proxy attribute(s) which are employed by the debugger to facilitate debugging of the application—"attributed debugging".

The system can facilitate a developer of a type to declaratively indicate how information is to be displayed during debugging (e.g., "only show this information"). Given that attributes are an extensible, declarative way of conveying runtime information, they can provide a mechanism for allowing the developer to specify that behavior.

Thus, in accordance with an aspect of the present invention, a different view of an object is provided to a user of the system. This can be accomplished by substituting a different object, a display proxy, to be examined by the expression evaluator. For example, the display proxy can be constructed within the debuggee process by passing in the object to be examined. This process can be referred to as a "proxy object for display" and/or "type viewer".

A "type viewer" is a mechanism in which a developer can associate a specific view with a type that the developer is interested in examining. In particular, this view can be constrained, for example, to a hierarchical name, value, type column view.

A viewer is a separate type (e.g., display proxy) which is associated with the object to be displayed via an attribute placed on the object's type when it is defined. The separate type can be thought of as the runtime 'view' of the object. The separate type can include, for example, the information necessary for a user to debug the object.

In one example, private implementation detail(s) are eliminated from the display proxy. For example, the viewer of a type can be defined as a private nested class within the type which it is meant to display. In this manner, the type viewer has full access to all of the private details of the type, and can make use of them in its public display. In this example, the only restriction on this nested class is that it must have a public constructor with a single argument. This argument is of the type which the viewer is meant to display.

The DebuggerTypeProxy attribute can be used to specify a display proxy of an object (e.g., type). It allows a developer to specify a particular viewer with the type on which it occurs.

Additionally and/or alternatively, the DebuggerTypeProxy attribute can be used at the assembly level. In this example, a Target parameter can specify the object (e.g., type) for which a display proxy will be used. For example, the attribute can refer to a completely different type which is external to the assembly in which the other type is defined.

An expression evaluator which supports type viewers can look for this attribute when a type is being displayed. If the attribute is found, the expression evaluator can substitute the display proxy in place of the object.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

"Attributes" refers to keyword-like tags in which additional information about entities can be specified. Attributes, which are saved with an assembly's metadata, annotate programming elements such as types, fields, methods, and properties. Other applications, such as compiler(s) and/or debugger(s) can refer to the information in attributes to determine how objects should be used. "Assembly" refers to a fundamental unit of deployment, version control, reuse, activation scoping, and/or security permissions. For example, an assembly can provide the common language runtime environment with the information it needs to be aware of type implementations. It is a collection of types and resources that are built to work together and form a logical unit of functionality. To the runtime, a type does not exist outside the context of an assembly.

Figure 1:
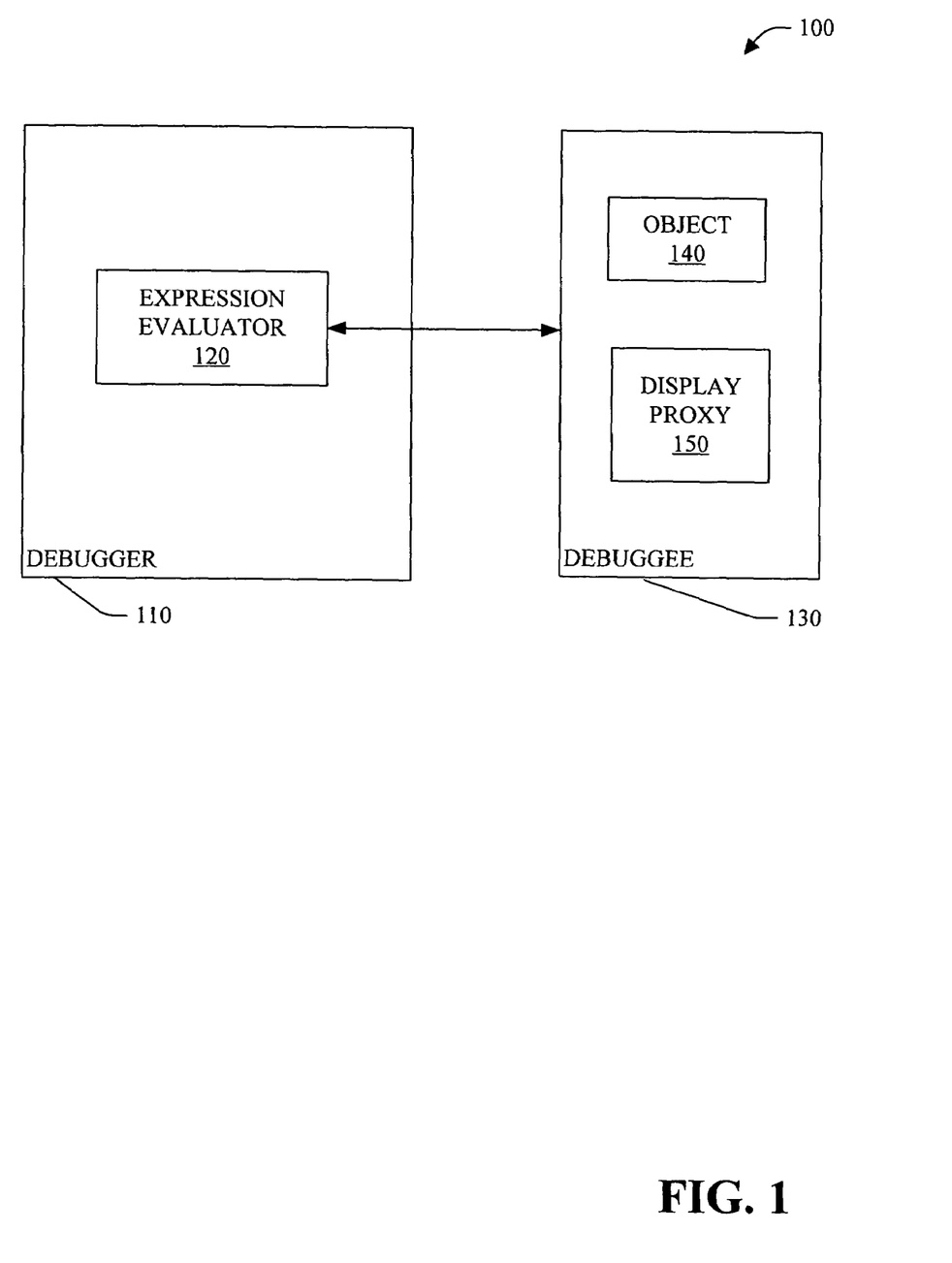
FIG. 1 is a block diagram of an attributed debugging system in accordance with an aspect of the present invention.

Referring to FIG. 1, an attributed debugging system 100 in accordance with an aspect of the present invention is illustrated. The system 100 includes a debugger 110 having an expression evaluator 120. The system 100 further includes a debuggee 130 (e.g., process to be debugged). The debuggee 130 includes object(s) 140 and further includes attribute(s) which are employed by the debugger 110 to facilitate debugging of the application—"attributed debugging".

Attributed debugging is the concept of allowing a developer of a type, the same developer and/or other developer(s) who understands and specifies the runtime behavior of that type, to also specify what that type will look like when it's being debugged.

Consider for a moment the canonical example of a collection type, say Hashtable. In general, developer(s) who are consuming Hashtable care only about the values that they store in it, and the values which they get out; in particular they care about the keys and values stored within the Hashtable and care very little for how the Hashtable is actually implemented.

In accordance with an aspect of the present invention, the developer of the Hashtable can declaratively indicate, in effect, "only show keys and values in the debugger". Given that attribute(s) are an extensible, declarative way of conveying runtime information, they can provide a mechanism for allowing the developer to specify that behavior.

In the case of Hashtable, the consumer's view of the data and the implementation can be highly disparate. So much so, that it's not enough to simply be able to show or hide members of the type.

Thus, in accordance with an aspect of the present invention, a different view of the collection type (e.g., Hashtable) is provided (e.g., to a user of the system 100). This can be accomplished done by substituting a different object, for example, a display proxy 150, to be examined by the expression evaluator 120. For example, the display proxy 150 can be constructed within the debuggee 130 process by passing in the object 140 to be examined. This process can be referred to as a "proxy object for display" and/or "type viewer".

A "type viewer" is a mechanism in which a developer can associate a specific view with a type that the developer is interested in examining. In particular, this view can be constrained, for example, to a hierarchical name, value, type column view.

As noted previously, the debugger 110 includes an expression evaluator 120. Conventional expression evaluators have a simplistic type viewer definition mechanism built-in, for example, in the form of the autoexp.dat (csee.dat, mcee.dat) files. Unfortunately, these files are very limited, in essence, nothing more then a rudimentary filtration system allowing certain data to be eliminated from the view, but generally nothing to be added. In addition, these files have been severely under-documented. Finally, the .dat files require that the changes be made on the end consumer's machine; yet, often the consumer of a component and the developer of a component are different people. Because of these short-comings, the usage of the conventional .dat files is quite small.

In accordance with an aspect of the present invention, the expression evaluator 120 facilitates attributed debugging. The expression evaluator 120 is responsible for evaluating expression(s) of a particular language. For example, there can be different expression evaluator(s) associated with different programming language(s) (e.g., C#, J#, and/or Visual Basic .NET).

A viewer is a separate type (e.g., display proxy 150) which is associated with the object 140 being displayed via an attribute placed on the object's type when it is defined. The separate type can be thought of as the runtime 'view' of the object 140. The separate type can include, for example, the information necessary for a user to debug the object 140.

In one example, private implementation detail(s) are eliminated from the display proxy 150. Further, significant effort can be devoted to making the display more simplistic (e.g., as opposed to being performance-based). However, the performance of type viewer(s) can be important because a type viewer is evaluated at generally every step.

For example, the viewer of a type can be defined as a private nested class within the type which it is meant to display. In this manner, the type viewer has full access to all of the private details of the type, and can make use of them in its public display. In this example, the only restriction on this nested class is that it must have a public constructor with a single argument. This argument is of the type which the viewer is meant to display. For example, a Hashtable can have a private nested display proxy 150 (e.g., HashtableDisplay type) that has public constructor which takes a Hashtable as an argument. In order to identify that a viewer is associated with a type, an attribute is introduced which indicates the type of the viewer. For example, Hashtable can have an attribute (e.g., DebuggerTypeProxyAttribute discussed below) on it indicating that HashtableDisplay is its viewer.

In another example, type viewer(s) can also make use of additional attribute(s) to control the resulting display, for example, DebuggerDisplay and/or DebuggerBrowsable attributes as discussed in greater detail in co-pending U.S. utility application Ser. No. 10/808,905, filed on Mar. 25, 2004 and entitled "ATTRIBUTED DEBUGGING". Briefly, the attributes discussed in that application facilitate manipulation of the view of data in the debugger by allowing the type author annotations with which they can control:

What value should be shown at the top-level for a given type reducing the need to expand the object for additional information;

Whether or not a field or property should be shown at all;

What the value should be shown for a field or property, for example, this value can be the result of an evaluation of an expression;

Whether a type should be shown fully expanded; and/or

More descriptive name or type information, for example, this information can be the result of the evaluation of an expression Thus, attributed debugging is a mechanism by which a component developer can, in a simple way, change the display of an object being debugged. For example, the mechanism can be accomplished by:

Overriding ToString

Annotating code with the DebuggerDisplayAttribute

Annotating code with the DebuggerBrowsableAttribute

The DebuggerBrowsableAttribute can be employed to determine how and/or whether a type or member is displayed in the data windows (e.g., never, expanded, collapsed and/or root hidden). Further, the DebuggerDisplayAttribute can be used to control what is displayed for the given class or field in the data windows in the debugger.

DebuggerTypeProxy Attribute

The DebuggerTypeProxy attribute can be used to specify a display proxy 150 of an object 140 (e.g., type). It allows a developer to specify a particular viewer with the type on which it occurs.

Additionally and/or alternatively, the DebuggerTypeProxy attribute can be used at the assembly level. In this example, a Target parameter can specify the object 140 (e.g., type) for which a display proxy 150 will be used. For example, the attribute can refer to a completely different type which is external to the assembly in which the other type is defined.

An expression evaluator 120 which supports type viewers can look for this attribute when a type is being displayed. If the attribute is found, the expression evaluator 120 can substitute the display proxy 150 in place of the object 140.

In one example, only the public members of the display proxy 150 are displayed by the debugger 110. Accordingly, private implementation of the display proxy 150 is hidden without the use of an additional attribution.

Further, data window behavior with attribute-enhanced view(s) can, optionally, mirror that of the undecorated views. For example, drag and drop can be employed with display proxy 150.

In one example, in order not to incur unnecessary performance penalties, the expression evaluator 120 does not examine the attributes on the display proxy 150 of the object 140 unless the object 140 (e.g., type) is expanded (e.g., through the user clicking the + next to the type in a data window). In this example, it is recommended that no attribute(s) be placed on the display proxy 150 (e.g., because the attribute(s) would not be evaluated). However, attribute(s) can be used within the body of the display proxy 150.

For example:

TABLE 1

```
[AttributeUsage (AttributeTargets.Struct | AttributeTargets.Class |
AttributeTargets.Assembly, AllowMultiple = true)]
    public sealed class DebuggerTypeProxyAttribute : Attribute
    {
      private string typeName;
      private Type target;
      public DebuggerTypeProxyAttribute (Type type)
      {
        this.typeName = type.AssemblyQualifiedName;
      }
      public DebuggerTypeProxyAttribute (string typeName)
      {
        this.typeName = typeName;
      }
      public string ProxyTypeName
      {
        get { return typeName; }
      }
      public Type Target
      {
        get { return target; }
        set { target = value; }
      }
    }
```

Overriding Attributes

In accordance with another aspect of the present invention, attribute(s) which are provided with the assembly can be overridden, even if the developer doesn't have the source code. In one example, the same attributes used in the source (as described above) can be used at the assembly level with the Target parameter. For example, the assemblies with these attributes can be placed into a specified folder and the debugger 110 processes them.

Installation

As mentioned previously, attribute(s) can be placed on types for the purposes of display even if the source code for the types isn't available. This can be accomplished, for example, by creating an assembly which has a set of assembly level attributes (e.g., the same attributes that would have originally been placed on the types) which have an additional named parameter called Target. Target simply takes the type on which to apply the attribute.

Conventionally, customizations to the data windows of the debugger were stored in a .dat file, per expression evaluator. In accordance with an aspect of the present invention, the debugger 110 loads assemblies from a specific cached directory. Upon installation of a development environment, the directory is created in the user's documents location and then checked for DLLs at debug-time, for example:

c:Documents and Settings\<username\>My Documents\development environment\Visualizers In this example, if an attribute is specified in this directory, it takes precedence over an attribute defined directly on the type.

In one example, a caching mechanism is employed such that an assembly can be copied into the directory and the attributes are then loaded; however, the caching mechanism ensures that an assembly doesn't need to be opened for metadata when a debug session is started. Instead a trivial check can be performed to ensure that the current directory matches the last cached state, assuming it does then only the cache is used to determine whether an attribute on a particular type is present. If it doesn't, then the cache is rebuilt.

It is to be appreciated that the system 100, the debugger 110, the expression evaluator 120, the debuggee 130, the object 140 and/or the display proxy 150 can be computer components as that term is defined herein.

Figure 2:
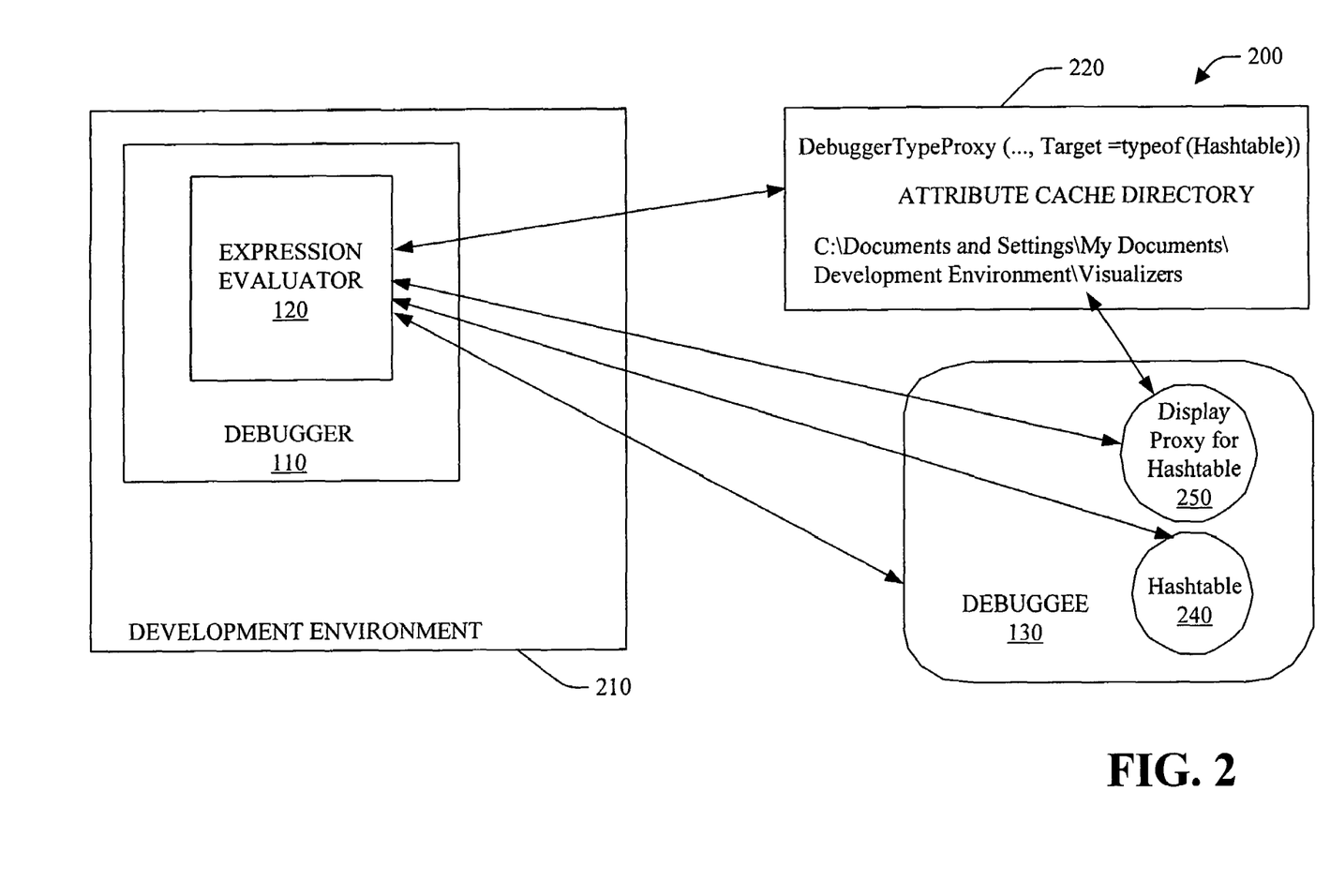
FIG. 2 is a block diagram of debug system in accordance with an aspect of the present invention.

Next, referring to FIG. 2, a debug system 200 in accordance with an aspect of the present invention is illustrated. The system 200 includes a development environment 210 having a debugger 110 that includes an expression evaluator 120. The system further includes an attribute cache directory 220, and, a debuggee 130 having a Hashtable 240.

The expression evaluator 120 is loaded by the debugger 110, which itself, is a component of the development environment 210. When debugging, the debugger 110 is attached to the debuggee 130 (e.g., the process being debugged). The expression evaluator 120 is responsible for evaluating expression(s) in the debuggee 130.

When the debugger 130 requests to examine the Hashtable 240, the expression evaluator 120 checks for the attribute DebuggerTypeProxy for Hashtable 240. If the attribute exists, the expression evaluator 120 creates a display proxy for Hashtable 250 in the debuggee 130. Thereafter, the expression evaluator 120 employs the display proxy for Hashtable 250.

Optionally, the expression evaluator 240 can store the display proxy for Hashtable 250 in the attribute cache directory 220. The expression evaluator 120 checks the attribute cache directory 220, and, in this example, happens to find an assembly level attribute, DebuggerTypeProxy for Hashtable 240. When the expression evaluator 120 is asked to display the Hashtable it evaluates the expression given by the DebuggerTypeProxy for Hashtable 240 in the attribute cache directory 220.

It is to be appreciated that the system 200, the development environment 210, the attribute cache directory 220, the Hashtable 240 and/or the display proxy for Hashtable 250 can be computer components as that term is defined herein.

Example Hashtable

As mentioned previously, the subject invention can be employed with any suitable object 140. An exemplary object 140 is a Hashtable. This example illustrates how a type viewer (e.g., display proxy 150) can be created for a complex collection type like a Hashtable. For example:

TABLE 2

```
[assembly: DebuggerTypeProxy(typeof(HashtableDisplay), Target =
typeof(Hashtable))]
class HashtableDisplay
{
  private Hashtable hashtable;
  public HashtableDisplay(Hashtable hashtable)
  {
    if (hashtable == null)
    {
      throw new ArgumentNullException("hashtable");
    }
    this.hashtable = hashtable;
  }
  public KeyValuePairs[ ] Items
  {
    get
    {
      KeyValuePairs[ ] array = new KeyValuePairs[hashtable.Count];
      int i = 0;
      foreach (DictionaryEntry de in hashtable)
      {
        array[i++] = new KeyValuePairs(de.Key, de.Value);
      }
      return array;
    }
  }
}
[DebuggerDisplay("{value}", Name = "{key}")]
class KeyValuePairs
{
  private object key;
  private object value;
  public KeyValuePairs(object key, object value)
  {
    this.value = value;
    this.key = key;
  }
  public object Key
  {
    get { return key; }
  }
  public object Value
  {
    get { return value; }
  }
}
```

Figure 3:
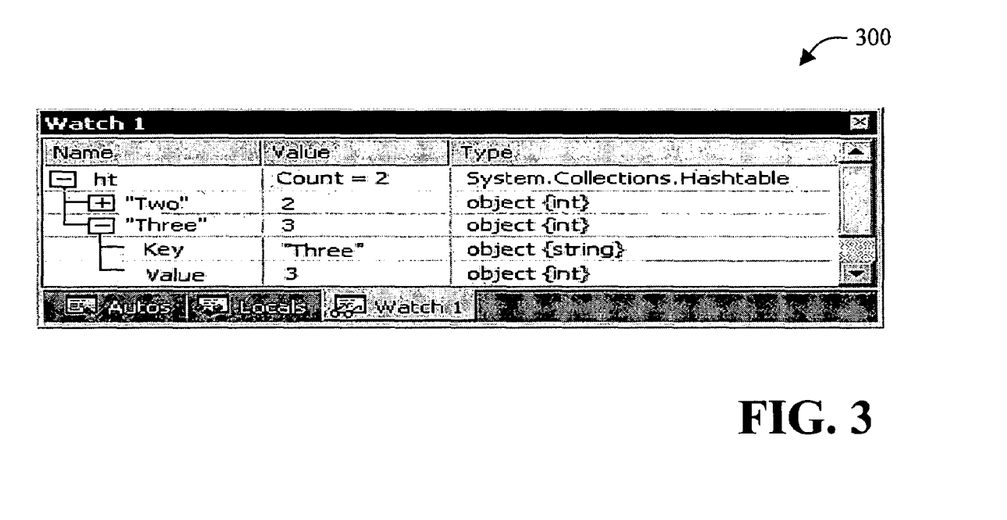
FIG. 3 is a diagram of an exemplary user interface in accordance with an aspect of the present invention.

Referring to FIG. 3, an exemplary user interface 300 in accordance with an aspect of the present invention is illustrated. The user interface 300 can be based upon the code set forth in Table 2.

Editing

Optionally, the system 100 can be employed to facilitate editing value(s) within the debugger 110.

For example, for a simple Date class:

TABLE 3

```
[DebuggerDisplay ("{Month}/{Day}/{Year}")]
[DebuggerTypeProxy (typeof(DateDisplay))]
class Date
{
  DateTime dt;
  public Date (DateTime dt)
  {
    this.dt = dt;
  }
  public int Month {get { return dt.Month; } }
```

TABLE 3-continued

```
public int Day { get { return dt.Day; } }
public int Year { get {return dt.Year; } }
class DateDisplay
{
    private Date d;
    public Display(Date d)
    {
        this.d = d;
    }
    [DebuggerDisplay ( "",Name="Set date ..." )]
    public string SetDate
    {
        get
        {
            return d.Month.ToString( ) + "/" + d.Day.ToString( ) + "/" +
                d.Year.ToString( );
        }
        set
        {
            DateTime dt = DateTime.Parse(value);
            d.dt = dt;
        }
    }
    public int Month { get { return d.Month; } }
    public int Day { get { return d.Day; } }
    public int Year { get { return d.Year; } }
}
}
```

In this example, the Date class has both a DebuggerDisplay attribute to show a nicely formatted date and a DebuggerTypeProxy attribute. The DebuggerTypeProxy attribute points to DateDisplay, which adds a property called SetDate. This also has a DebuggerDisplay attribute on it which is an example of how to change the Name column of a field and why it would be useful.

Figure 4:
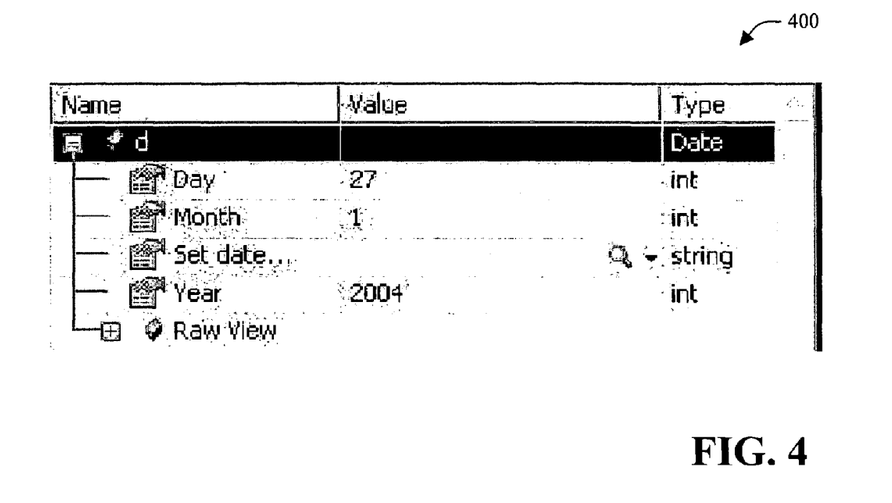
FIG. 4 is a diagram of an exemplary user interface in accordance with an aspect of the present invention.
Figure 5:
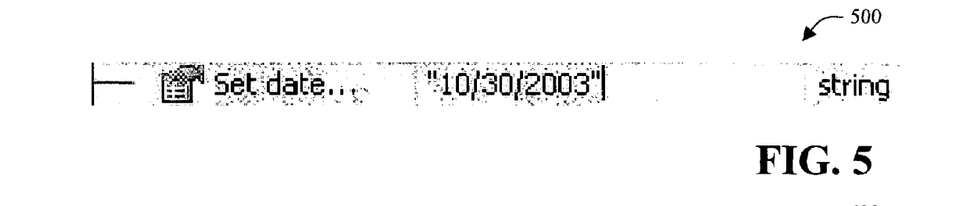
FIG. 5 is a diagram of an exemplary user interface in accordance with an aspect of the present invention.
Figure 6:
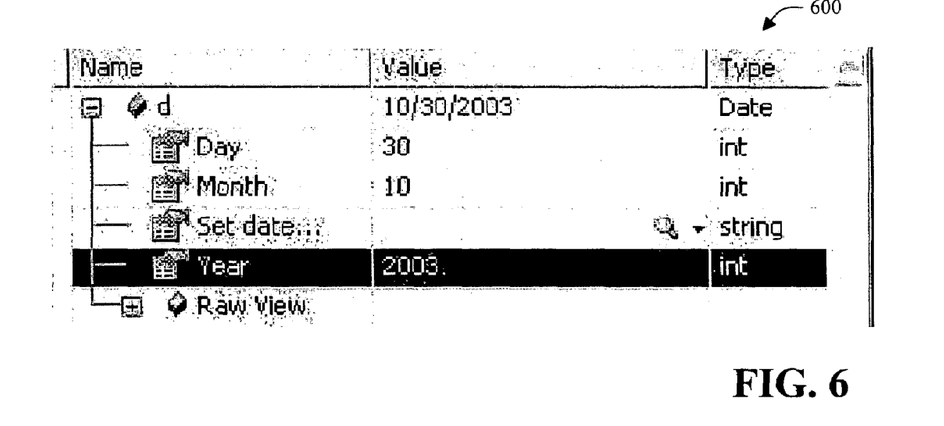
FIG. 6 is a diagram of an exemplary user interface in accordance with an aspect of the present invention.

Referring to FIG. 4, an exemplary user interface 400 in accordance with an aspect of the present invention is illustrated. The user interface 400 illustrates a date viewed in the debugger 110. In accordance with an aspect of the present invention, "SetDate" can be edited (e.g., in a very natural way), as illustrated in FIG. 5. When "enter" is pressed, the rest of the values are updated as illustrated in FIG. 6. Notice that "Month" is now set to "10").

Figure 7:
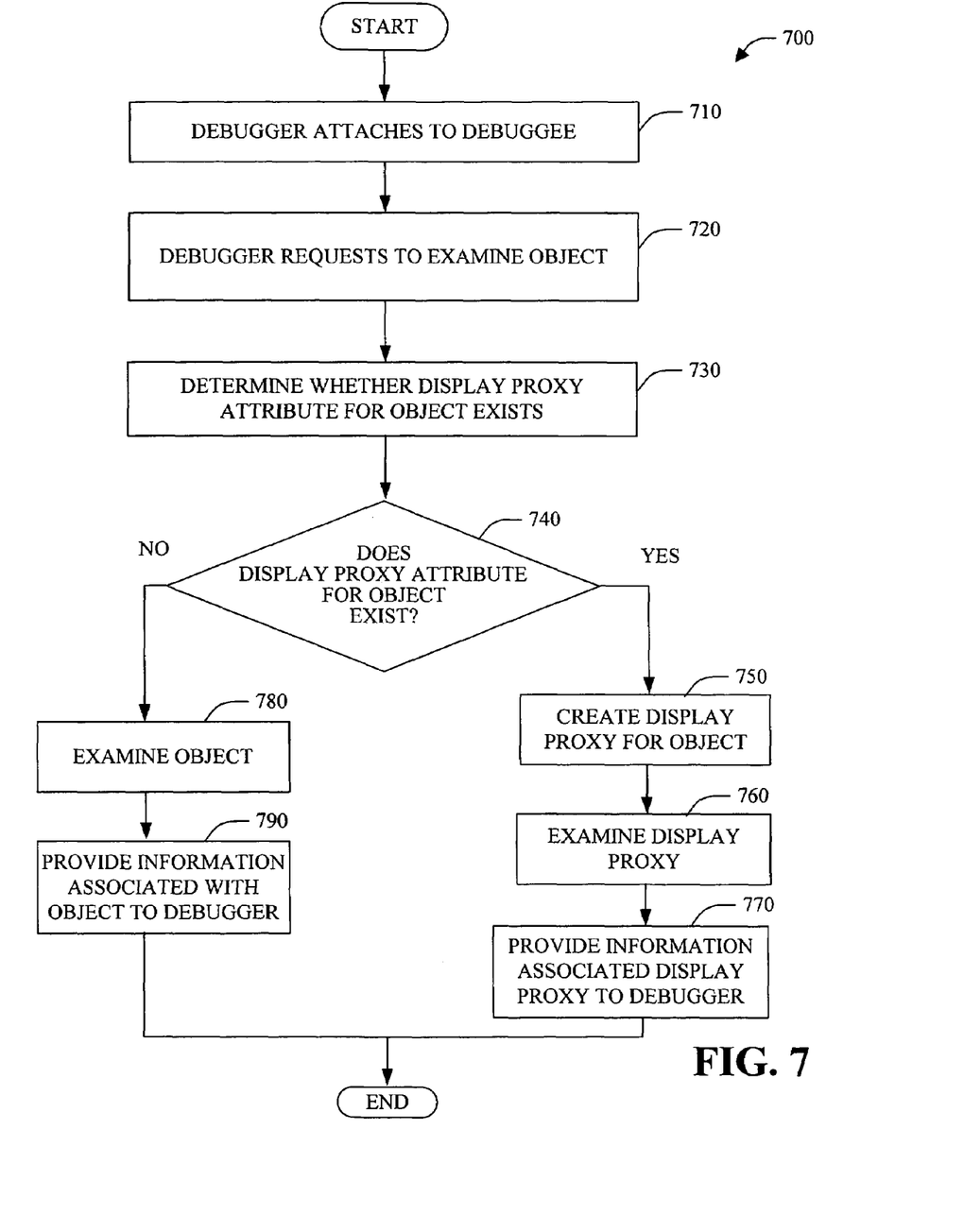
FIG. 7 is a flow chart of a method facilitating attributed debugging in accordance with an aspect of the present invention.

Turning briefly to FIG. 7, a methodology that may be implemented in accordance with the present invention are illustrated. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 7, a method facilitating attributed debugging 700 in accordance with an aspect of the present invention is illustrated. At 710, a debugger attaches to a debuggee (e.g., process to be debugged). At 720, a request to examine an object is received (e.g., from the debugger). At 730, an expression evaluator determines whether a display proxy attribute exists for the requested object. At 740, a determination is made as to whether the display proxy attribute exists for the object.

If the determination at 740 is YES, at 750, a display proxy is created for the object. At 760, the display proxy is examined. At 770, information associated with the display proxy is provided to the debugger, and, no further processing occurs.

If the determination at 740 is NO, at 780, the object is examined. At 790, information associated with the object is provided to the debugger, and, no further processing occurs.

Figure 8:
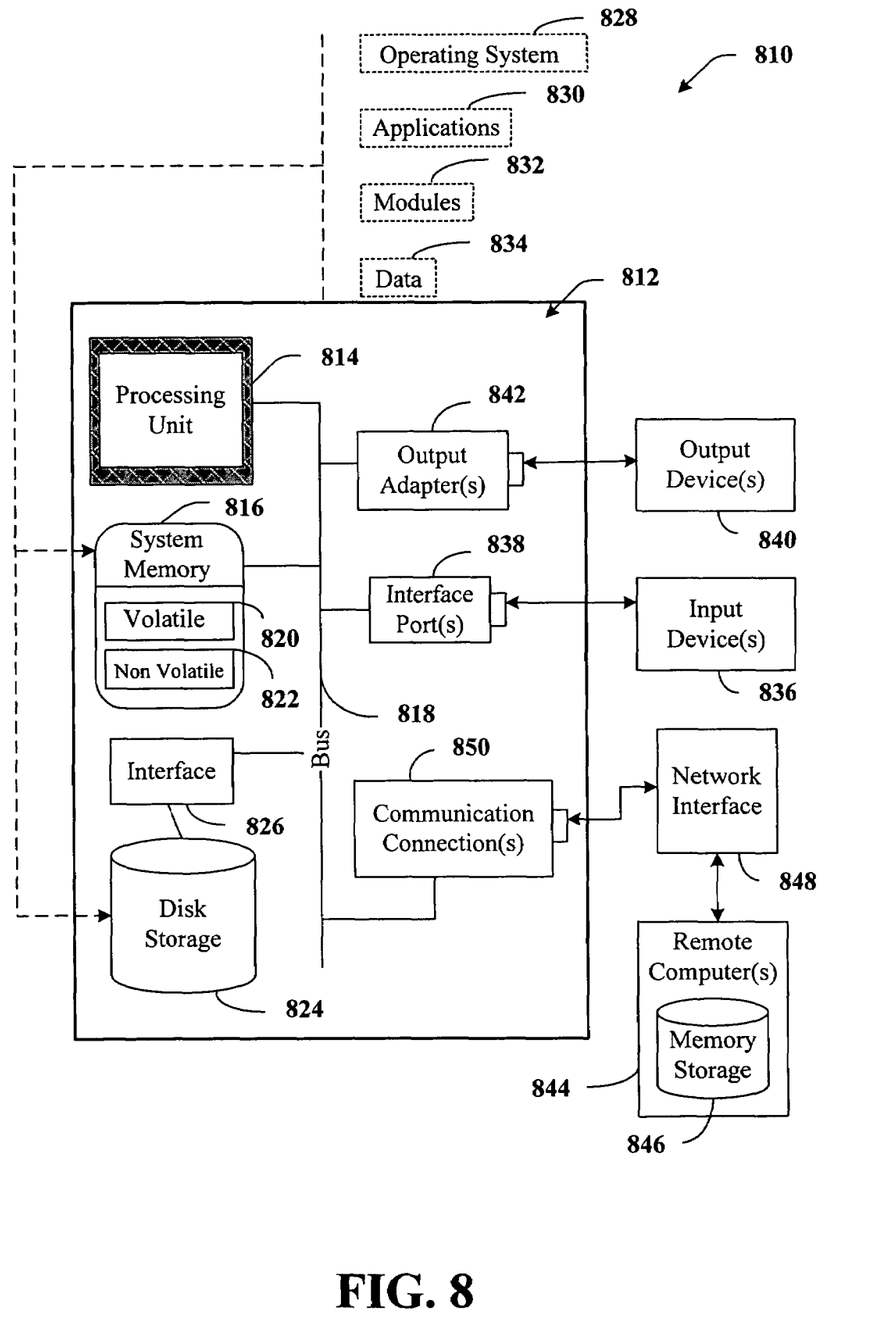
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented attributed debugging system comprising:

a processor;

system memory;

a debugger that facilitates debugging of a computer software application, the debugger obtaining from a computer user one or more attributes for attributed debugging, the attributes comprising keyword-like tags provided by the computer user which are configured to annotate various programming elements to indicate whether the computer user desires the elements to be displayed and, if so, how the computer user desires the elements to be displayed during debugging, the attributes including values of one or more properties of an object of the computer software application, the debugger being configured to allow the computer user to specify for each runtime object which object information is to be displayed and how that object information is to be displayed using attributes;

an expression evaluator, associated with the debugger, that examines a display proxy in place of the object to determine debug information related to the object, the display proxy is implemented as a private nested class of the object, the display proxy is configured with specified values to expose a subset of the one or more properties of the object, the subset excludes implementation-specific properties of the object; and a variable display component that presents, to the computer user, those specified values associated with the subset of the one or more properties of the object exposed by the display proxy, wherein only those values specified for display by the computer user are displayed and wherein the specified values are displayed in the manner indicated by the computer user.

2. The system of claim 1, the expression evaluator evaluates an expression associated with the object to determine the values, the expression is implemented in a particular programming language.

3. The system of claim 2, the programming language comprising at least one of C#, J#or Visual Basic.Net.

4. The system of claim 2, further comprising a plurality of expression evaluators, wherein each expression evaluator is associated with a different programming language.

5. The system of claim 1, the object comprises a class that includes at least one of a property or a method.

6. The system of claim 1, the expression evaluator creates an instance of the display proxy associated with the object of the computer software application.

7. The system of claim 1, the display proxy has access to private implementation specifics of the object.

8. The system of claim 1, further comprising an attribute cache directory that stores an attribute associated with the display proxy, the expression evaluator employs the stored attribute to determine the values of the one or more properties of the object.

9. The system of claim 1, further comprising an editing component that facilitates modifying a value associated with the object.

10. The system of claim 1, the variable display employs at least one attribute associated with the object that provides a format to display the determined values of one or more properties of the object.

11. The system of claim 10, the attribute specifies the property is displayed.

12. The system of claim 11, the attribute employs an enumeration to specify the format of the display.

13. The system of claim 12, the enumeration includes one enumeration value that indicates the property should not be displayed to the computer user.

14. The system of claim 12, the enumeration includes one enumeration value that indicates a hierarchical property is expanded by default.

15. The system of claim 12, the enumeration includes one enumeration value that indicates a hierarchical property is not expanded by default.

16. The system of claim 12, the enumeration includes one enumeration value that indicates a hierarchical property itself is not displayed and members of the hierarchical property are displayed.

17. The system of claim 10, the attribute specifies what is displayed for a class.

18. The system of claim 17, the attribute includes an argument that comprises a string that is displayed in a value column for an instance of the class.

19. The system of claim 17, the argument is associated with a property of the class.

20. A method facilitating attributed debugging comprising:
receiving a request to examine details of one or more properties of an object in a computer software application being debugged;
receiving from a computer user one or more specified values associated with display proxy attributes for attributed debugging, the display proxy attributes comprising keyword-like tags provided by the computer user which are configured to annotate various programming elements to indicate whether the computer user desires the elements to be displayed and, if so, how the computer user desires the elements to be displayed during debugging in the debugger, the display proxy attributes including values of one or more properties of an object of the computer software application, the debugger being configured to allow the computer user to specify for each runtime object which object information is to be displayed and how that object information is to be displayed using attributes;
accessing the received display proxy attribute for the object, the display proxy is implemented as a private nested class of the object such that the display proxy within the definition of the object, the display proxy provides relevant properties regarding a state of the object and conceals properties related to implementation of the object;
creating a display proxy for the object in accordance with the display proxy attribute;
examining the display proxy in place of the object to determine debug information related to the object;
presenting to the computer user the object associated with the display proxy, wherein only those objects with specified values associated with display proxy attributes specified for display by the computer user are displayed and wherein the specified objects are displayed in the manner indicated by the computer user.

21. The method of claim 20 further comprising providing the debug information determined by the display proxy to computer user in response to the request to examine the object.

22. A computer readable medium having stored thereon computer executable instructions for carrying out the method of claim 20.

23. An attributed debugging system comprising:
processing means;
memory means;
means for receiving a request to debug an object in a computer software application;
means for receiving from a computer user one or more specified values associated with display proxy attributes for attributed debugging, the display proxy attributes comprising keyword-like tags provided by the computer user which are configured to annotate various programming elements to indicate whether the computer user desires the elements to be displayed and, if so, how the computer user desires the elements to be displayed during debugging in the debugger, the display proxy attributes including values of one or more properties of an object of the computer software application, the debugger being configured to allow the computer user to specify for each runtime object which object information is to be displayed and how that object information is to be displayed using attributes;
means for accessing the received display proxy attribute in association with the object, the display proxy is implemented as a private nested class of the object such that the display proxy within the definition of the object, the display proxy provides relevant properties regarding a state of the object and conceals properties related to implementation of the object;
means for creating an instance of the display proxy;
means for examining the display proxy in place of the object to determine debug information related to the object, means for examining the display proxy comprise means for obtaining values of the provided relevant properties;
means for providing debug information in response to the request to debug the object, the debug information is based at least in part on the display proxy and includes at least the obtained values of the provided relevant properties;

means for presenting to the computer user the object associated with the display proxy, wherein only those objects with specified values associated with display proxy attributes specified for display by the computer user are displayed and wherein the specified objects are displayed in the manner indicated by the computer user.

24. A computer-implemented attributed debugging system, comprising:

a processor;

system memory;

a debugger that facilitates debugging of a computer software application, the debugger obtaining from a computer user one or more attributes for attributed debugging, the attributes comprising keyword-like tags provided by the computer user which are configured to annotate various programming elements to indicate whether the computer user desires the elements to be displayed and, if so, how the computer user desires the elements to be displayed during debugging, the attributes including values of one or more properties of an object of the computer software application, the debugger being configured to allow the computer user to specify for each runtime object which object information is to be displayed and how that object information is to be displayed using attributes, wherein the attributes are configured to control the following based on the computer user's indication:

which value is to be shown at the top-level for a given type whereby the need to expand the object for additional information is reduced;

whether or not a field or property for a programming element should be shown or not shown;

what the value should be shown for a field or property of the programming element;

whether a type is to be shown fully expanded; and adding descriptive name or type information to the programming element;

an expression evaluator, associated with the debugger, that examines a display proxy in place of the object to determine debug information related to the object, the display proxy is implemented as a private nested class of the object, the display proxy is configured with specifies values to expose a subset of the one or more properties of the object, the subset excludes implementation-specific properties of the object; and a variable display component that presents, to the computer user, those specified values associated with the subset of the one or more properties of the object exposed by the display proxy, wherein only those values specified for display by the computer user are displayed and wherein the specified values are displayed in the manner indicated by the computer user.

* * * * *